United States Patent
Villano et al.

(10) Patent No.: US 9,481,773 B2
(45) Date of Patent: Nov. 1, 2016

(54) METHOD AND PLANT FOR ETCHING A FLUOROPOLYMER SUBSTRATE

(71) Applicant: Guarniflon S.p.A., Castelli Calepio, Bergamo (IT)

(72) Inventors: Massimo Villano, Brescia (IT); Pasquale Stella, Bergamo (IT)

(73) Assignee: GUARNIFLON S.P.A., Castelli Calepio, Bergamo (IT)

( * ) Notice: Subject to any disclaimer, the term of this patent is extended or adjusted under 35 U.S.C. 154(b) by 0 days.

(21) Appl. No.: 15/022,150

(22) PCT Filed: Oct. 10, 2013

(86) PCT No.: PCT/IT2013/000280
§ 371 (c)(1),
(2) Date: Mar. 15, 2016

(87) PCT Pub. No.: WO2015/052736
PCT Pub. Date: Apr. 16, 2015

(65) Prior Publication Data
US 2016/0237231 A1    Aug. 18, 2016

(51) Int. Cl.
*B44C 1/22* (2006.01)
*C03C 15/00* (2006.01)
*C03C 25/68* (2006.01)
*C23F 1/00* (2006.01)
*C08J 7/14* (2006.01)
*B01D 61/02* (2006.01)

(52) U.S. Cl.
CPC ............... *C08J 7/14* (2013.01); *B01D 61/022* (2013.01); *B01D 61/025* (2013.01); *B01D 2311/25* (2013.01); *B01D 2311/263* (2013.01); *B01D 2311/2669* (2013.01); *C08J 2327/18* (2013.01)

(58) Field of Classification Search
CPC ..... C08J 7/14; C08J 2327/18; B01D 61/025; B01D 2311/263; B01D 2311/2669
USPC ........................... 216/83; 156/345.18, 345.2
See application file for complete search history.

(56) References Cited

U.S. PATENT DOCUMENTS 5,635,071 A * 6/1997 Al-Samadi ........... B01D 61/022
  210/641
6,077,913 A * 6/2000 Beholz ..................... C08F 8/06
  427/308

* cited by examiner

*Primary Examiner* — Roberts Culbert
(74) *Attorney, Agent, or Firm* — MacMillan, Sobanski & Todd, LLC

(57) ABSTRACT

(Semi-)continuous etching method for a fluoropolymer substrate (10) comprising steps of feeding (22) said substrate (10) in the form of a continuous ribbon wherein said substrate defines a primary surface (12), subjecting to at least one etching operations (2) a part of the primary surface (12) by means of an adhesion-promoting solution comprising a complex of an alkali metal in naphthalene, washing (4) the primary surface (12) wetted by the adhesion-promoting solution by means of a washing solution (42) comprising aqueous acetic acid/formic acid, and selectively separating a concentrated solution (24) of acetic acid/formic acid from the washing solution (42) by means of inverse osmosis operations (6, 8) at ■ increasing pressures, and re-introducing at least a portion of the concentrated solution (24) of acetic acid/formic acid in the washing solution (42) to create a recirculation. The invention further relates to an etching plant.

19 Claims, 4 Drawing Sheets

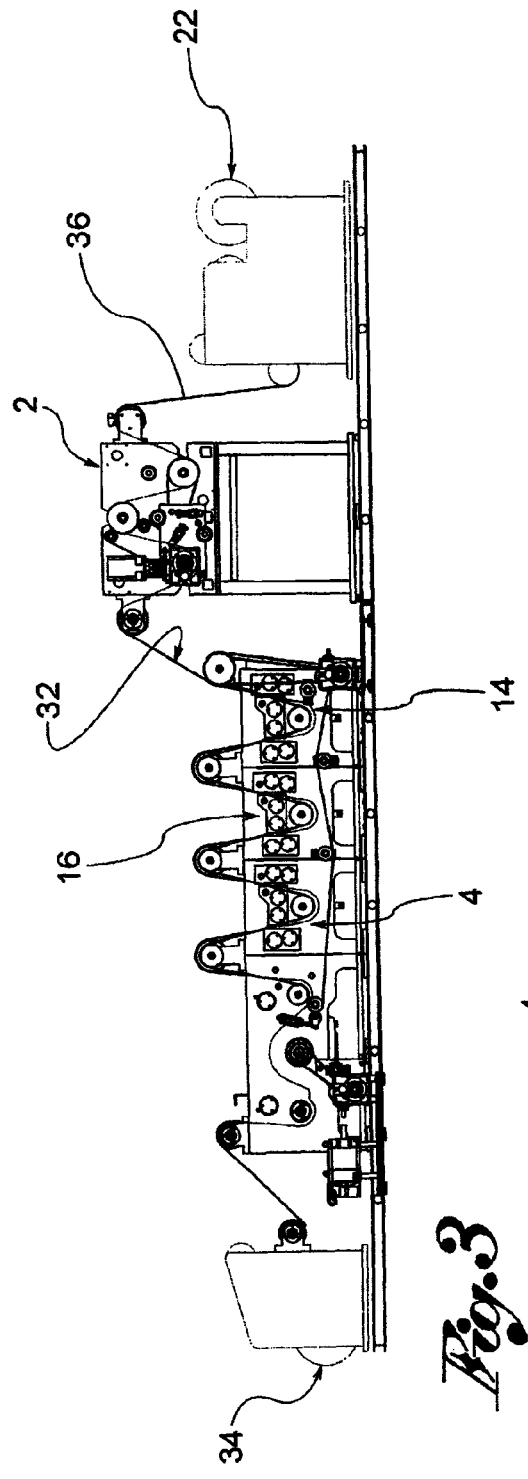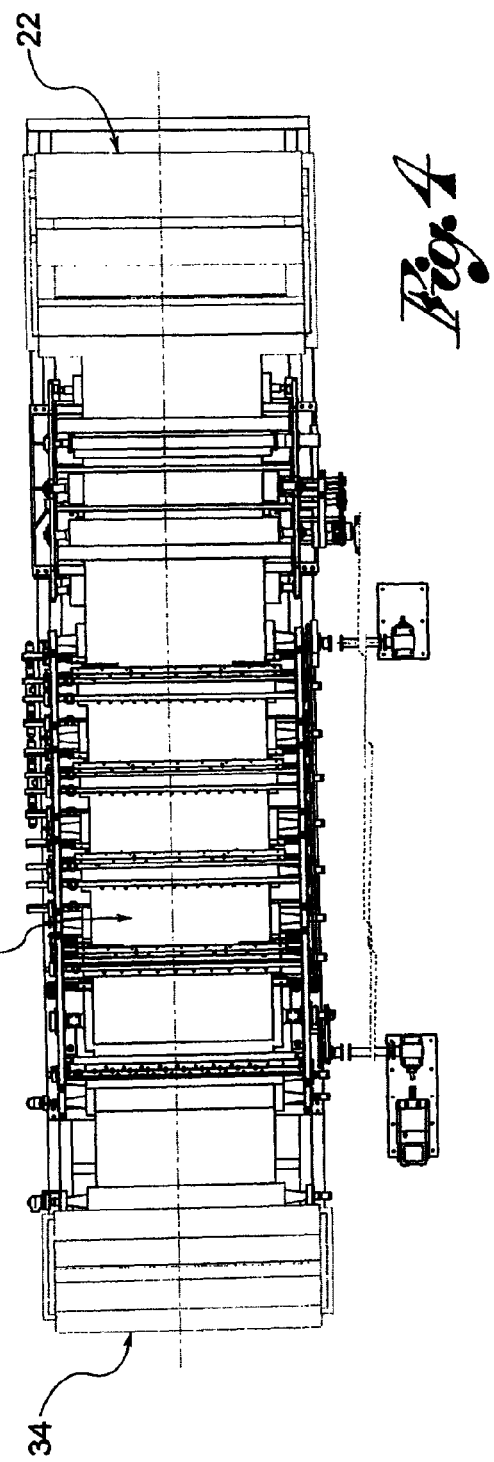

METHOD AND PLANT FOR ETCHING A FLUOROPOLYMER SUBSTRATE

Figure 1:
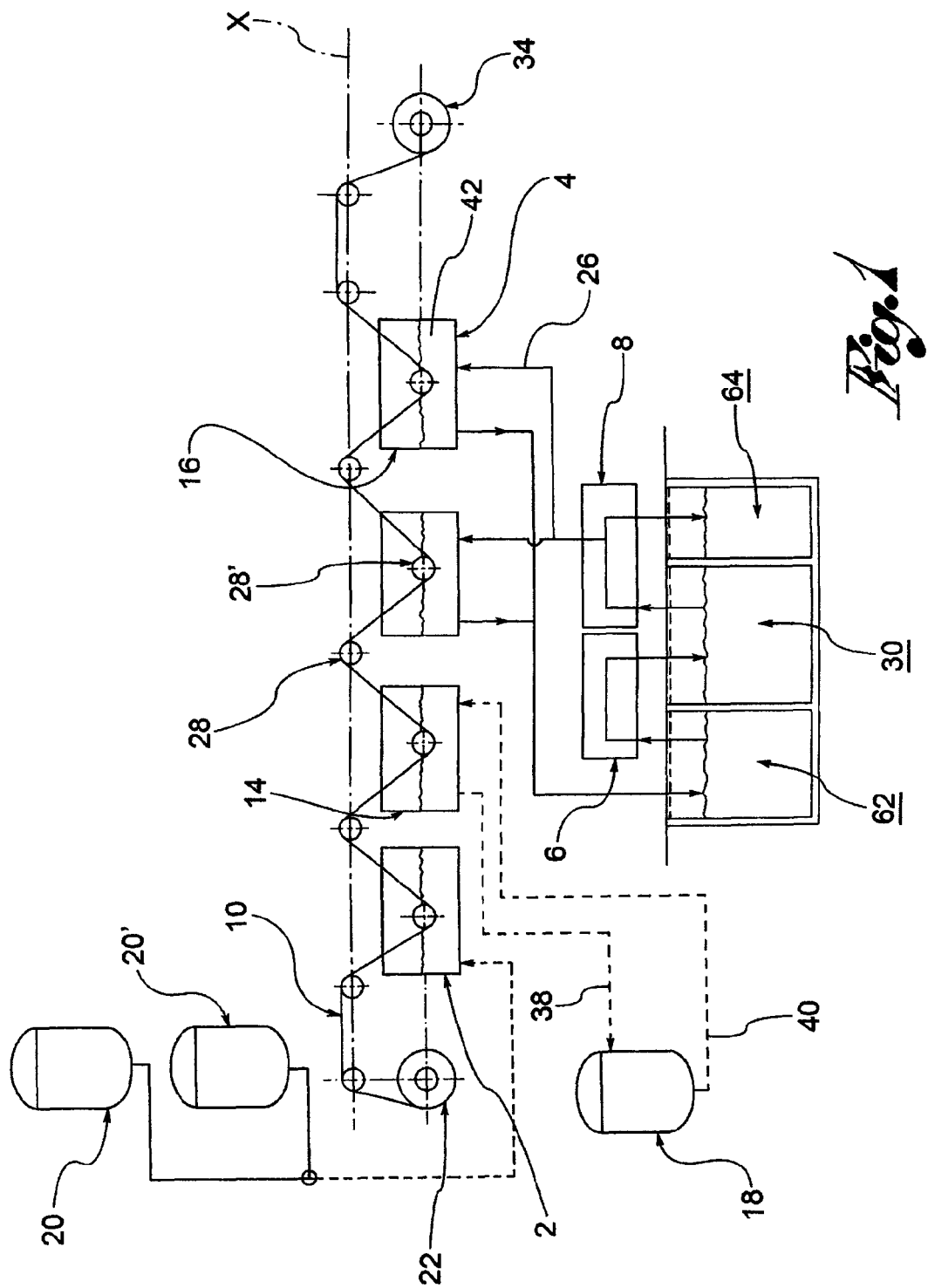

This is a national stage application filed under 35 USC §371 of international application PCT/IT2013/000280, filed Oct. 10, 2013, the entire disclosures of which are expressly incorporated herein by reference.

The present invention relates to a method and a plant for treating a fluoropolymer substrate, and in particular, a method/plant for etching a fluoropolymer substrate to increase the surface adhesion of such substrate.

The chemical resistance of polytetrafluoroethylene (PTFE) is a feature which has made such fluoropolymer extremely desirable in the chemical industry, for example for coating reactors or piping, in the presence of reactions by their nature aggressive. PTFE has replaced asbestos—today banned by law given its carcinogenic nature—in a plurality of applications, such as for example coating high temperature cables. In addition, the biocompatibility of PTFE has led the biomedical industry to use it to make implantable elements and in medical devices to be used inside the human body. The unique nature of the dielectric properties of fluoropolymers in general, and of PTFE in particular, has allowed the development of a new market in the printed circuit boards sector.

The above applications require it to be possible to glue the PTFE to an underlying surface.

It is precisely the chemical structure of PTFE which plays against its ability to remain firmly attached to respective supports. To obviate this aspect, in the past numerous technical solutions have been attempted to firmly anchor the fluoropolymers to various types of substrate, such as steel appliances or printed circuit boards.

One of the available methods involved the reaction between an alkali metal and the fluorine of the polymer, however in reaction conditions which might be unarguably deemed explosive, in particular in the presence of tetrahydrofuran (THF) or anhydrous ammonia. The variant with ammonia did not however permit the safe storage of the etching solution given the low boiling point (approximately −31° C.) of the mixture; conversely the THF, although stable at ambient temperature, is extremely inflammable.

Even the methods subsequently proposed proved rather unsatisfactory from an environmental point of view or as regards the safety of the process.

A first purpose of the present invention is therefore to provide a method, and a relative plant, able to perform the etching of PTFE on an industrial scale and in conditions of extreme safety. It is a further purpose of the present invention to provide a method and a plant integrated within themselves, but above all clean from an environmental point of view, able to drastically reduce the quantity of pollutants released in an act of responsible sacrifice.

These and other purposes are achieved by a method according to claim 1, and by a plant according to claim 9. The dependent variants describe preferred or advantageous embodiments.

Figure 2:
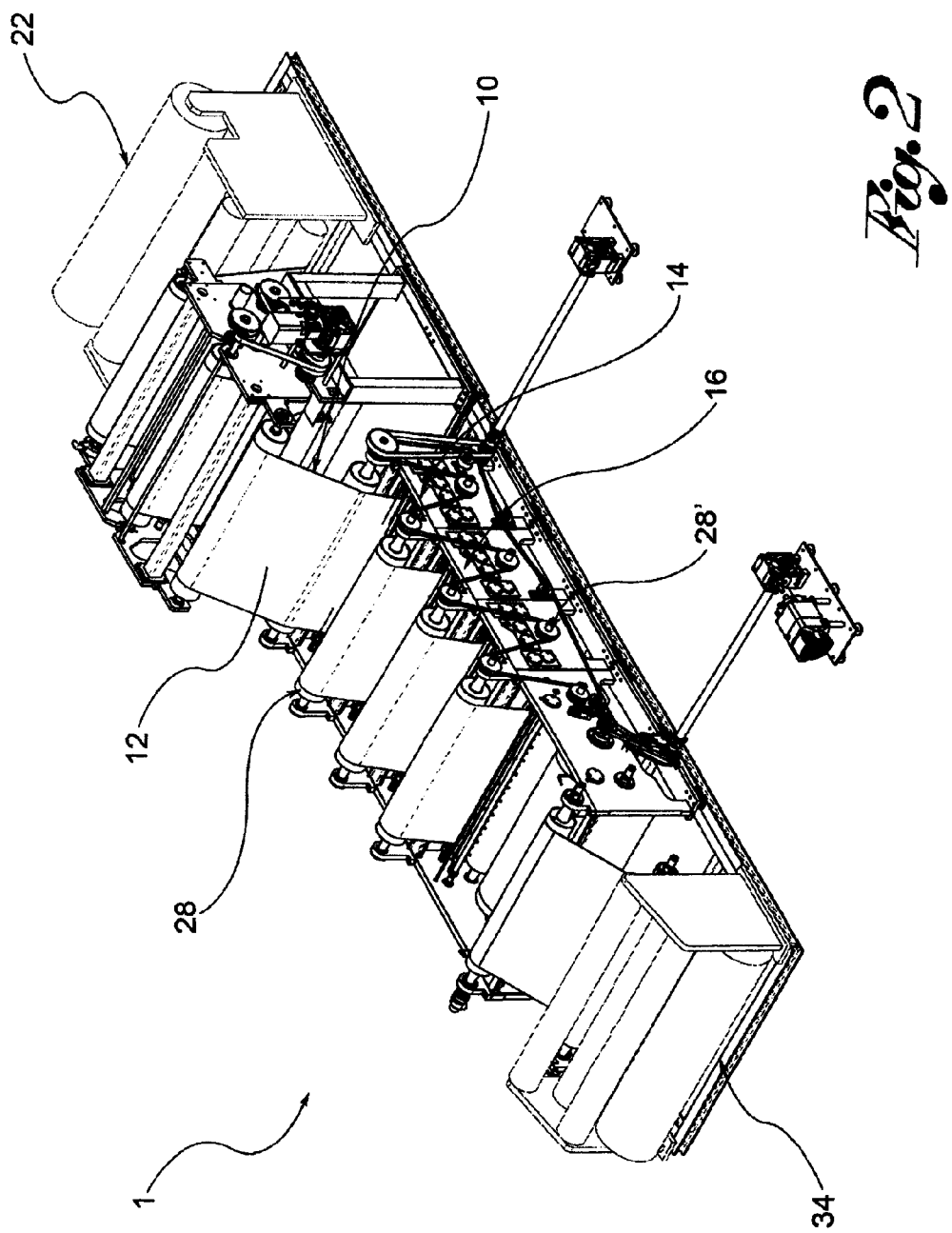
Figure 5:
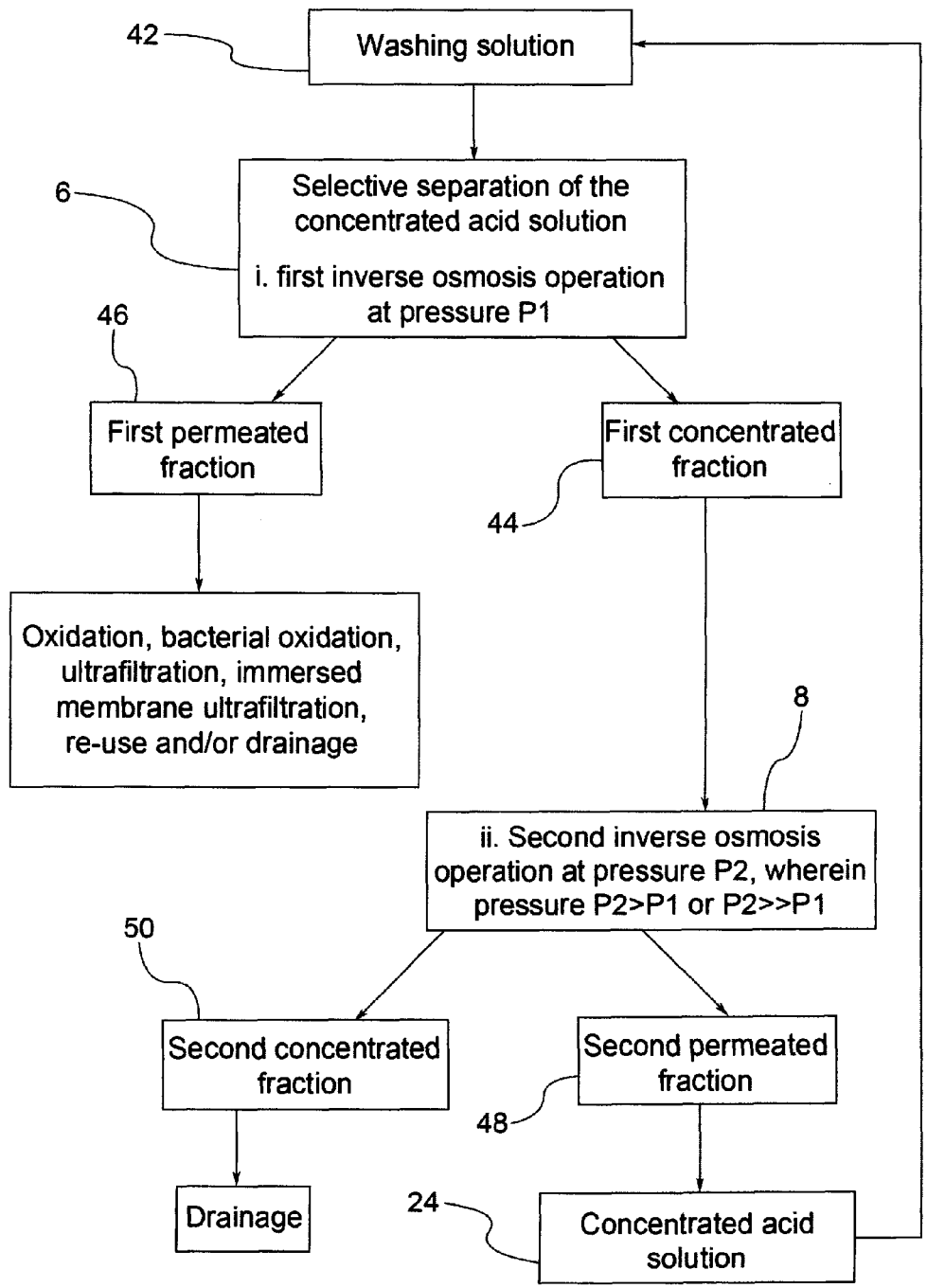

The object of the present invention will now be described in detail with the help of the attached drawings, wherein:

FIGS. 1 and 5 respectively show a schematic diagram of the method according to the present invention and a schematic diagram of the selective separation of the concentrated acid solution, according to possible embodiments;

FIGS. 2, 3 and 4 respectively show a perspective view, a cross-section lateral view and a view from above, of a part of the etching plant according to the present invention, according to one variant.

In the aforesaid figures, identical reference numerals will indicate identical or corresponding parts.

In particular the explanation of the method which follows will be made with reference to the reference numerals of the corresponding means of the plant 1 with which a given step is performed. So, merely by way of example, reference numeral 4 refers both to the step of washing the primary surface and to the removal bath in which such step is performed.

The present etching method which, as said, is used to increase the surface adhesion of a fluoropolymer substrate 10, comprises a first step of feeding 22 such fluoropolymer substrate in the form of a continuous ribbon or film along a feeding direction X, where such substrate defines at least a primary surface 12. Preferably, such substrate is a substrate in polytetrafluoroethylene (PTFE). Further embodiments foresee that the fluoropolymer is selected from the group consisting in PTFE, fluorinated ethylene propylene (FEP), perfluoroalkoxy (PFA), polyvinylidene fluoride (PVDF)—or the like—and mixtures thereof.

Consequently, the present method is a (semi)-continuous etching method, which is performed at least on the primary surface which is thus the surface which at the end of the steps discussed below will prove to have improved surface adhesion.

Within the present description the term "etching" is understood to mean a chemical process suitable for making the fluoropolymer substrate suitable for gluing to other surfaces, by improving its adhesive properties.

In addition, within the present invention the term "feed direction X" is understood to mean directions of supplying the substrate not necessarily rectilinear, though some variants may provide for such. However, such term will also and above all be understood as a direction roughly parallel to the main extension of the fluoropolymer ribbon or film having a "complex" pattern, that is to say a succession of loops, curves, straight sections etc.

According to a shown embodiment, the entire continuous fluoropolymer ribbon or film is subjected to etching, so that in such case not only the primary surface 12 but also an opposite surface 32 delimiting the thickness the ribbon or film will undergo such treatment. Equally, a connection surface 36 connecting such surfaces 12, 32 may also be etched or not.

In other words, one embodiment provides that the entire substrate is immersed in or at least wetted by the adhesion-promoting solution.

In a further step, at least a part of the primary surface 12 is subjected to one or more etching operations 2 by means of an adhesion-promoting solution comprising a complex of an alkali metal in naphthalene.

Consequently, such step is essential for the fluoropolymer substrate to adhere firmly to various types of supports, varied according to the desired application, and provides for the partial removal of the atoms of fluorine ("defluorination") from one of the aforesaid surfaces of the substrate.

Preferably the alkali metal used is sodium, in as much as deemed by the authors of the present invention as one of the most reliable chemical abrasives of fluoropolymers. Further embodiments may provide for the use of lithium, potassium or mixtures thereof, (including mixtures of the same with sodium).

According to one advantageous embodiment, the adhesion-promoting solution is produced by means of a solubilisation/reaction 20, 20' which is preferably performed in situ, between diethylene glycol dimethyl ether, the alkali metal and the naphthalene.

The advantages related to the use of diethylene glycol dimethyl ether, are the high level of stability at ambient temperatures (and even slightly over ambient temperatures), the reduced inflammability with a flash point of approximately 57° C., and the viscosity similar to that of water which it gives to the adhesion-promoting solution, such latter being a significant technological advantage. Added to this is a sufficient propensity of such mixture to "wet" the surfaces of the fluoropolymer substrate.

In yet a further step of the present method the part of the primary surface 12 wetted by the adhesion-promoting solution is washed 4 by means of a washing solution 42 comprising aqueous acetic acid or aqueous formic acid.

This way, all the residues of the adhesion-promoting solution are removed from the primary solution and the etching process is thus stopped. Optionally, subsequent to the washing step 4, a step of winding 34 the continuous ribbon or film of fluoropolymer substrate 10 in one or more collection bobbins is provided for, which can thus be stored.

According to a further preferred embodiment, the step of washing with the washing solution 42 may be preceded by a first step of pre-washing 14 in an organic phase (comprising or consisting for example of diethylene glycol dimethyl ether), and of a second step of pre-washing 16 in an aqueous phase with water at a temperature above ambient temperature.

Consequently, at the end of the washing and the optional pre-washings, the removal of the adhesion-promoting solution proves virtually to be complete.

According to a particularly advantageous embodiment, the organic phase may be purified, for example distilled 18, and may be re-introduced in the first pre-washing step 14.

According to a particularly advantageous variant, the washing step may be followed by a step of drying the continuous ribbon or film of fluoropolymer substrate 10, for example at a temperature of approximately 50° C.-100° C., preferably of approximately 60°-80° C. To such purpose, downstream of the removal bath 4 discussed below a drying oven could be provided.

In yet a further step of the method, a concentrated solution 24 of acetic acid, or of formic acid for some variants, is selectively separated from the washing solution 42 by means of inverse osmosis operations 6, 8 at increasing pressure.

In other words, the separation step foresees a previous operation of inverse osmosis 6 (at a first pressure P1) and a subsequent operation of inverse osmosis 8 (at a second pressure P2), wherein said latter operation takes place at a higher pressure than the pressure P1 (P2>P1 or P>>P1). For example, the second pressure P2 may be approximately 2-10 times the first pressure P1 used in the previous operation 6.

In a preferred variant of the method, the separation step comprises a first (or previous) 6 and a second (or subsequent) 8 operation of inverse osmosis, the second operation being conducted on a concentrated fraction 44 coming from the first operation. To such purpose, reference is made for example to the schematic diagram in FIG. 5.

For example, since the first concentrated fraction 44 proceeds towards the second inverse osmosis operation leaving a first permeated fraction 46 from the first inverse osmosis operation 6, such permeated fraction 46 may be subjected to one or more steps selected from the group consisting in oxidation, bacterial oxidation, ultrafiltration, immersed membrane ultrafiltration, reuse and/or drainage, despite the last being the least preferred of the embodiments.

In an advantageous variant of the method, a second permeated fraction 48 of the second inverse osmosis operation 8 forms the concentrated solution 24 of acetic acid or of formic acid.

In fact, the presence of an increased pressure in the second operation 8 causes an enrichment of acetic acid (or formic acid) in the second permeated fraction 48, since the latter has a titre substantially corresponding to the concentrated solution 24.

Optionally, the second permeated fraction 48 could have an acid concentration even higher than that needed for the washing solution 42. In such case, it could be preferable to dilute the concentrated acid solution, for example by means of the water used in the second pre-washing step 16.

Consequently, the method according to the present invention further comprises a step of introducing at least a portion of the concentrated solution of acetic acid 24 or of formic acid in the washing solution 42 to thus create a recirculation.

This way, it is in fact possible to avoid a tout court disposal of such acid in the external environment for example in a water course. In addition, such method virtually eliminates the need to use "fresh" acetic acid or formic acid for the continuation of the (semi-)continuous method.

In other words, since the purification yields of the washing solution 42 are extremely high (2-3% of residual polluted waters to be sent for disposal), with the method and plant discussed the use of new materials can be drastically limited. Advantages of a productive and environmental nature ensue.

The present invention further relates to a (semi-)continuous etching plant 1 for increasing the surface adhesion of a fluoropolymer substrate 10. Preferably, such plant has proved particularly suitable for implementing the method just discussed above so that, even where not expressly specified, such plant provides for all the technical means needed to conduct any of the previous steps of the method.

The plant 1 comprises feeding means 22 of the fluoropolymer substrate 10 in the form of a continuous ribbon or film along a feeding direction X, said substrate delimiting the primary surface 12 and preferably the opposite surface 32

As shown for example schematically in FIG. 2, the feeding means 22 comprise one or more feed bobbins, from which the fluoropolymer substrate is progressively unwound in the direction X. According to a further embodiment (not shown), the feeding means may comprise a production plant of the substrate in fluoropolymer. Consequently, in such variant, the winding of the aforesaid substrate onto bobbins becomes superfluous, in that the plant according to the present invention may be positioned directly downstream of a fluoropolymer production plant.

Within the present description, the terms "upstream" and "downstream" are understood to mean the apparatus positioned respectively before or after the appliances specified in relation to the feed direction X, or in relation to the flow direction of the specified process fluids.

The plant 1 further foresees one or more etching tanks 2 containing the adhesion-promoting solution comprising the complex of the alkali metal in naphthalene for the chemical attack of at least a part of the primary surface 12. This way the etching at least of such surface takes place.

Consequently, the fluoropolymer ribbon or film may be immersed in said tank 2, or may lick the free surface of the tank so that only one surface undergoes the chemical attack. Optionally, in order to wet the primary surface with the adhesion-promoting solution the system disclosed in the publication U.S. Pat. No. 4,637,856 could be used, the teaching of which is considered incorporated in the present invention.

According to an advantageous variant, the plant 1 comprises a plurality of return calenders 28, 28' for the continuous fluoropolymer substrate 10, positioned and distanced along the feed direction X to immerse the substrate 10 in the adhesion-promoting solution and/or in the washing solution, and optionally in the organic phase and/or aqueous phase.

According to a particularly advantageous variant, the plant 1 comprises at least one synthesis reactor 20, 20' in which the washing solution is produced by means of an in situ reaction between diethylene glycol dimethyl ether, the alkali metal and the naphthalene. Such reactor is preferably fluidically connected to the etching tank 2 or to the plurality thereof. For example, as shown schematically in the diagram in FIG. 1, a pair of synthesis reactors 20, 20' positioned parallel to each other may be provided.

The plant 1 further comprises a removal bath 4 of the adhesion-promoting solution from the part of the primary surface 12 wetted by said solution, wherein the removal bath contains the washing solution comprising aqueous acetic acid or aqueous formic acid.

According to one embodiment, downstream of the removal bath 4, the plant comprises at least one collection bobbin 34 of the fluoropolymer substrate of increased surface adhesion.

According to a further embodiment, upstream of the removal bath 4 of the adhesion-promoting solution, the plant 1 may comprise a first pre-washing bath 14 in the organic phase (in particular comprising diethylene glycol dimethyl ether), and a second pre-washing bath 16 in the aqueous phase, for example containing water at a temperature above ambient temperature.

For the variants providing for the first pre-washing bath 14, distillation means 18 of the organic phase may also be provided, fluidically communicating with said first pre-washing bath 14 so as to create a secondary recirculation.

This way, the organic phase could be withdrawn from the first bath 14 (via the line 38 in FIG. 1), and re-emitted (line 40) following an at least partial purification in said first pre-washing bath 14 in a preferably (semi-)continuous manner.

The plant 1 further comprises inverse osmosis stations 6, 8 working at increasing pressures P1, P2 configured to selectively separate the concentrated solution 24 of acetic acid or of formic acid from the washing solution.

To such purpose, at least one inverse osmosis station (6 or 8 but preferably both stations 6, 8) preferably comprises a multi-layer separation membrane comprising a non-woven support layer, an intermediate micro-porous layer, and a protective layer of the intermediate layer.

Given that the support layer gives good dimensional stability but an unsatisfactory separation ability of the acetic acid, and given the aggressive ambient in which the membrane finds itself operating in, the association of the aforesaid layers has proved surprisingly effective in isolating the concentrated acid solution.

According to a preferred embodiment, the support layer comprises polyester, the intermediate layer is polysulfonic and the protective layer is a coating applied to the intermediate layer. In particular the protective layer has a thickness of approximately 2500 ∈ngstrom or less, and preferably of approximately 2000 ∈ngstrom. For example, one possible membrane which could be used in the aforesaid inverse osmosis station is made by "The Dow Chemical Company" under the brand name "Filmtec® FT30 Membrane".

The plant 1 further comprises means for re-introducing 26 at least a portion of the concentrated solution 24 of acetic acid or formic acid in the washing solution to form a recirculation.

This way, as said, a considerable quantity of acid can be recovered from the used washing solution (that is to say containing a quantity no longer acceptable of adhesion-promoting solution or of the single components thereof), so as to re-introduce it in the removal bath 4.

According to a particularly advantageous embodiment, a first 6 and a second 8 inverse osmosis station are respectively positioned upstream and downstream of a second collection environment 30, configured to receive a first concentrated fraction 44 from the first inverse osmosis station 6, and to send to the removal bath 4 a second permeated fraction 48 of the second inverse osmosis operation 8 which forms the concentrated solution 24 of acetic acid or of formic acid.

In other words, the second collection environment 30 creates an intermediate storage area to compensate any deficits (or excesses) which might occur in the mass balance between the flow entering the first concentrated fraction 44 and the flow coming out of the second permeated fraction 48.

However, as regards the second permeated fraction 50 generated by the second inverse osmosis operation 8, such fraction is preferably drained by the plant, and for example sent for special disposal outside said plant. For example, such permeated fraction 50 may be collected in a dedicated drainage environment 64.

Optionally, between the removal bath 4 and the second collection environment 30 a first collection environment 62 may be provided which receives, on a transitory basis, the used washing solution coming from the removal bath and from which the first inverse osmosis station 6 withdraws such solution.

The purpose of the present invention will now be illustrated on the basis of several non-limiting examples.

EXAMPLE 1

Synthesis of the Adhesion-Promoting Solution

In a reactor holding 200 liters, at a temperature of 50-60° C. and subject to constant stirring, a first quantity of diethylene glycol dimethyl ether (technical titre) amounting to approximately 80-180 kg (for example 100-150 kg), and a second quantity of sodium naphthalene of approximately 5-50 kg (for example 15-35 kg) with a ratio of sodium-naphthalene of 1:1 or 2:1 are mixed together. Such variability of weight is due mainly to the etching quality or target to be achieved. The mixture is made to react for a time of approximately 1-6 hours or 2-4 hours, and is subsequently fed to the etching tank or to the plurality thereof.

EXAMPLE 2

Synthesis of the Washing Solution

The washing solution is made by mixing in approximately 100 liters of water, a volume of acetic acid at 99.9% until a pH of the solution of approximately 2-6, preferably 3-5, for example approximately 4, is reached.

The initial concentration of acetic acid in the removal bath, before start washing of the primary surface, is substantially the same that can be achieved at the end of the second inverse osmosis stage when the plant is operational.

Innovatively, the plant and method according to the present invention are suitable to prevent mere drainage of the washing waters containing acetic and other acids, any contaminants deriving from the etching process in the external environment, and drastically reduce the use of water and fresh acid.

In fact, advantageously, the plant and method according to the present invention allow consistent savings in water consumption. In particular an average consumption of water in traditional plants was to the order of 50-80 m$^3$/day. However, by means of the present invention, such volume can be reduced to approximately 0.5-1.5 m$^3$/day, with a total annual saving of 12,000-20,000 m$^3$ of water.

Advantageously, the plant and method described make it possible to re-use other process fluids, with a consequent benefit in productive and environmental terms.

Advantageously, the plant and method described have been specially designed for the etching of the fluoropolymer, and the separation appliances have been optimised specifically for such purpose.

Advantageously, the plant and method according to the present invention make it possible to achieve efficient production cycles which, by virtue of the constructive simplicity described above permit a desirable improvement to be achieved compared to the etching methods of the prior art.

Even if not previously specified, a person skilled in the art may make variations to any of the aforementioned aspects, replacing them with others technically equivalent, resorting to the expertise typical of the sector.

These variations or replacements are also contained within the sphere of protection defined by the following claims.

In addition, any alternatives illustrated in relation to a particular embodiment may be realised independently of the other variants described.

The invention claimed is:

1. A (semi-)continuous etching method for increasing the surface adhesion of a fluoropolymer substrate (10) comprising, in sequence, the steps of:
   feeding (22) a fluoropolymer substrate (10) in the form of continuous ribbon or film along a feeding direction (X), said substrate defining a primary surface (12);
   subjecting to one or more etching operations (2) at least a part of the primary surface (12) by means of an adhesion-promoting solution comprising a complex of an alkali metal, such as sodium, in naphthalene;
   washing (4) the part of the primary surface (12) wetted by the adhesion-promoting solution by means of a washing solution (42) comprising aqueous acetic acid or formic acid;
   selectively separating a concentrated solution (24) of acetic acid or of formic acid from the washing solution (42) by means of inverse osmosis operations (6, 8) at increasing pressure;
   re-introducing at least a portion of the concentrated solution (24) of acetic acid or of formic acid in the washing solution (42) to create a recirculation.

2. Method according to claim 1, wherein a subsequent operation of inverse osmosis (8) takes place at a pressure 2-10 times the pressure of a previous operation (6).

3. Method according to claim 1, wherein the separation step comprises a first (6) and a second (8) operation of inverse osmosis, the second operation being conducted on a first concentrated fraction (44) coming from the first operation.

4. Method according to claim 3, wherein a first permeated fraction (46) of the first inverse osmosis operation (6) is subjected to one or more steps selected from the group consisting in oxidation, bacterial oxidation, ultrafiltration, immersed membrane ultrafiltration, reuse and/or drainage.

5. Method according to claim 3, wherein a second permeated fraction (48) of the second inverse osmosis operation (8) forms the concentrated solution (24) of acetic acid or of formic acid.

6. Method according to claim 1, wherein the step of washing (4) with the washing solution (42) is preceded by a first step of pre-washing (14) in an organic phase comprising diethylene glycol dimethyl ether, and by a second step of pre-washing (16) in an aqueous phase, for example with water at a temperature above ambient temperature.

7. Method according to claim 6, wherein said organic phase may be purified by means of distillation (18) and re-introduced in the first pre-washing step (14).

8. Method according to claim 1, wherein the adhesion-promoting solution is produced by means of a reaction in situ (20, 20') between diethylene glycol dimethyl ether, the alkali metal and naphthalene.

9. Method according to claim 1, comprising at least one synthesis reactor (20, 20') wherein the adhesion-promoting solution is produced by means of a reaction in situ between diethylene glycol dimethyl ether, alkali metal and naphthalene, said reactor being fluidically connected to the etching tank (2) or to the plurality thereof.

10. Method according to claim 1, wherein the fluoropolymer is selected from the group consisting in fluorinated ethylene propylene, perfluoroalkoxy, polyvinylidene fluoride and mixtures thereof.

11. A (semi-)continuous etching plant (1) for increasing the surface adhesion of a fluoropolymer substrate (10) comprising:
   feeding means (22) of the fluoropolymer substrate (10) in the form of a continuous ribbon or film along a feeding direction (X), said substrate defining a primary surface (12);
   one or more etching tanks (2) containing an adhesion-promoting solution comprising a complex of an alkali metal in naphthalene for the chemical etching of at least a part of the primary surface (12);
   a removal bath (4) of the adhesion-promoting solution from the part of the primary surface (12) wetted by said solution, said removal bath containing a washing solution (42) comprising aqueous acetic acid or aqueous formic acid;
   inverse osmosis stations (6, 8) working at increasing pressure, configured to selectively separate a concentrated solution (24) of acetic acid or of formic acid from the washing solution (42);
   means for re-introducing (26) at least a portion of the concentrated solution (24) of acetic acid or of formic acid in the washing solution (42) to create a recirculation.

12. Plant according to claim 11, wherein at least one inverse osmosis station (6; 8) comprises a multi-layer separation membrane comprising a non-woven support layer, an intermediate micro-porous layer, and a protective layer of the intermediate layer.

13. Plant according to claim 12, wherein the support layer comprises polyester, the intermediate layer is polysulfonic and wherein the protective layer is a coating, preferably having a thickness of approximately 2500 Ångstrom or less, applied to the intermediate layer.

14. Plant according to claim 11, wherein a first (6) and a second (8) inverse osmosis stations are respectively positioned upstream and downstream of a second collection environment (30), configured to receive a first concentrated fraction (44) from the first inverse osmosis station (6), and to send to the removal bath (4) a second permeated fraction (48) of the second inverse osmosis operation (8) which forms the concentrated solution (24) of acetic acid or of formic acid.

15. Plant according to claim 11, comprising, upstream of the removal bath (4) of the adhesion-promoting solution, a first pre-washing bath (14) in an organic phase comprising diethylene glycol dimethyl ether, and a second pre-washing bath (16) in an aqueous phase, for example containing water at a temperature above ambient temperature.

16. Plant according to claim 11, comprising a plurality of return calenders (28, 28') of the continuous fluoropolymer substrate (10), positioned along the feed direction (X) to immerse said substrate (10) in the adhesion-promoting solution and/or in the washing solution (42), and optionally in the organic phase and/or aqueous phase.

17. Plant according to claim 15, comprising a plurality of return calenders (28, 28') of the continuous fluoropolymer substrate (10), positioned along the feed direction (X) to immerse said substrate (10) in the adhesion-promoting solution and/or in the washing solution (42), and optionally in the organic phase and/or aqueous phase.

18. Plant according to claim 15, comprising distillation means (18) of the organic phase, fluidically communicating with the first pre-washing bath (14) so as to create a secondary recirculation.

19. Plant according to claim 11, wherein the fluoropolymer is selected from the group consisting in fluorinated ethylene propylene, perfluoroalkoxy, polyvinylidene fluoride and mixtures thereof.

* * * * *